United States Patent
Ishizaki et al.

(10) Patent No.: US 9,611,378 B2
(45) Date of Patent: Apr. 4, 2017

(54) 2-CYANOACRYLATE ADHESIVE COMPOSITION

(71) Applicant: TOAGOSEI CO., LTD., Tokyo (JP)

(72) Inventors: Kenichi Ishizaki, Nagoya (JP); Yushi Ando, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 15/124,293

(22) PCT Filed: Feb. 27, 2015

(86) PCT No.: PCT/JP2015/055827
§ 371 (c)(1),
(2) Date: Sep. 7, 2016

(87) PCT Pub. No.: WO2015/137156
PCT Pub. Date: Sep. 17, 2015

(65) Prior Publication Data
US 2017/0015814 A1     Jan. 19, 2017

(30) Foreign Application Priority Data
Mar. 12, 2014 (JP) ................................ 2014-048607

(51) Int. Cl.
| | |
|---|---|
| *C08K 5/43* | (2006.01) |
| *C08K 5/19* | (2006.01) |
| *C08K 5/3462* | (2006.01) |
| *C08K 5/3445* | (2006.01) |
| *C09J 4/00* | (2006.01) |
| *C09J 7/02* | (2006.01) |
| *C09J 11/06* | (2006.01) |
| *C09J 135/04* | (2006.01) |
| *C08F 22/32* | (2006.01) |

(52) U.S. Cl.
CPC .................. *C08K 5/43* (2013.01); *C08K 5/19* (2013.01); *C08K 5/3445* (2013.01); *C08K 5/3462* (2013.01); *C09J 7/0267* (2013.01); *C09J 135/04* (2013.01); *C09J 2205/102* (2013.01); *C09J 2425/006* (2013.01)

(58) Field of Classification Search
CPC .... C09J 4/00; C09J 11/06; C08K 5/19; C08K 5/43
USPC ........................................ 156/331.2; 526/298
See application file for complete search history.

(56) References Cited

U.S. PATENT DOCUMENTS

| | | | |
|---|---|---|---|
| 4,460,759 A | | 7/1984 | Robins |
| 2008/0003196 A1* | | 1/2008 | Jonn et al. .............. A61L 24/06 424/78.08 |
| 2010/0030258 A1 | | 2/2010 | Badejo et al. |
| 2015/0225627 A1 | | 8/2015 | Ishizaki et al. |

FOREIGN PATENT DOCUMENTS

| | | |
|---|---|---|
| GB | 2228943 A | 9/1990 |
| JP | S53-129231 A | 11/1978 |
| JP | S58-089674 A | 5/1983 |
| JP | S60-179482 A | 9/1985 |
| JP | S62-100567 A | 5/1987 |
| JP | S63-128088 A | 5/1988 |
| JP | 2000-044891 A | 2/2000 |
| JP | 2000-516289 A | 12/2000 |
| JP | 2011-529979 A | 12/2011 |
| WO | 9807801 A1 | 2/1998 |
| WO | 2014/042082 A1 | 3/2014 |

OTHER PUBLICATIONS

International Search Report for PCT/JP2015/055827 mailed May 19, 2015; English Translation submitted herewith (5 Pages).

* cited by examiner

*Primary Examiner* — Fred M Teskin
(74) *Attorney, Agent, or Firm* — Fitch, Even, Tabin & Flannery LLP

(57) ABSTRACT

An adhesive composition is provided which exhibits an excellent adhesion rate on metals and low-polarity thermoplastic elastomers, and is excellent in appearance with no clouding of hardened bodies and is good in storage stability. It is a 2-cyanoacrylate-based adhesive composition which includes (a) a 2-cyanoacrylic acid ester and (b) an onium salt represented by the general formula: $C^+A^-(1)$ where, in formula (1), $C^+$ represents an onium cation, and $A^-$ represents a bis(fluorosulfonyl)imide anion.

4 Claims, No Drawings

2-CYANOACRYLATE ADHESIVE COMPOSITION

CROSS-REFERENCE TO RELATED APPLICATIONS

This application is a U.S. national phase application filed under 35 U.S.C. §371 of International Application No. PCT/JP2015/055827, filed Feb. 27, 2015, designating the United States, which claims priority from Japanese Patent Application No. 2014-048607, filed Mar. 12, 2014, and the complete disclosures of which applications are hereby incorporated herein by reference in their entirety for all purposes.

TECHNICAL FIELD

The present invention relates to a 2-cyanoacrylate-based adhesive composition containing a 2-cyanoacrylic acid ester as the principal component.

BACKGROUND ART

A 2-cyanoacrylate-based adhesive composition quickly establishes a strong bonding among various types of materials based on the unique anion polymerization characteristics exhibited by its principal component, 2-cyanoacrylic acid ester, which initiates polymerization under the presence of weak anion provided by slight moisture or the like attached to a surface of an adherend. Accordingly, it is used as the so-called instantaneous adhesive in a wide range of fields including industrial, medical, and household applications. However, since the setting of the 2-cyanoacrylate-based adhesive composition proceeds by anion polymerization, problems of lowered adhesion rate and insufficient adhesion strength resulting from inhibition of anion polymerization have been found when adherends are made of wood which is acidic or a metal which easily forms an oxide skin. Furthermore, problems of anion polymerization suppression and lowered adhesion rate have been found when adherends are made of a thermoplastic elastomer or the like that is low in polarity. To overcome such problems, various types of additives have been proposed heretofore. For instance, Patent Document 1 discloses an adhesive composition containing crown ethers, and Patent Document 2 discloses an adhesive composition containing polyalkylene oxides. Further, Patent Documents 3 and 4 disclose adhesive compositions containing calixarenes. Furthermore, Patent Document 5 describes using a phase transfer catalyst as a hardening accelerator for the 2-cyanoacrylate-based composition.

CONVENTIONAL TECHNICAL DOCUMENTS

Patent Documents

Patent Document 1: Japanese Patent Publication (Laid-open) No. Sho. 53-129231
Patent Document 2: Japanese Patent Publication (Laid-open) No. Sho. 63-128088
Patent Document 3: Japanese Patent Publication (Laid-open) No. Sho. 60-179482
Patent Document 4: Japanese Patent Publication (Laid-open) No. 2000-44891
Patent Document 5: British Patent Publication GB2228943 specification

SUMMARY OF INVENTION

Problems to be Solved by the Invention

The adhesive compositions disclosed in Patent Documents 1 to 4 have accelerated adhesion rate for various adherends, however, with increasing demand on productivity, the adhesion rate is still unsatisfactory when adherends are of metals or low-polarity thermoplastic elastomers. Further, even in the case of using the phase transfer catalyst specifically described in Patent Document 5 as hardening accelerator, the adhesion rate is still insufficient when adherends are metals or low-polarity thermoplastic elastomers.

In addition, the adhesive compositions containing crown ethers or polyalkylene oxides as disclosed in Patent Documents 1 and 2 have a problem of clouding of hardened bodies when adherends are of EPDM, a methacrylic resin or the like. The adhesive compositions containing calixarene derivatives as disclosed in Patent Documents 3 and 4 also have the problem of clouding of hardened materials when adherends are of soft PVC.

The present invention is made in light of the aforementioned circumstances, and aims at providing an adhesive composition having good storage stability and exhibiting an excellent adhesion rate for metals and low-polarity thermoplastic elastomers. Also, it aims at providing an adhesive composition that gives a hardened body free from clouding and thus excellent in appearance for a wide range of adherends.

Means for Solving the Problems

The present inventors have found that an adhesive composition which is excellent in appearance of hardened bodies and storage stability and exhibits an excellent adhesion rate for metals and low-polarity thermoplastic elastomers can be obtained by blending an onium salt having a specific structure with a 2-cyanoacrylic acid ester, and have accomplished the present invention.

The present invention is as follows:

1. A 2-cyanoacrylate-based adhesive composition which comprises (a) a 2-cyanoacrylic acid ester and (b) an onium salt represented by the following general formula (1):

$$C^+A^- \tag{1}$$

wherein, in formula (1), $C^+$ represents an onium cation, and $A^-$ represents a bis(fluorosulfonyl)imide anion.

2. The 2-cyanoacrylate-based adhesive composition according to the above item 1, wherein the cation of the onium salt (b) is at least one onium cation selected from a group consisting of a quaternary ammonium cation, an imidazolium cation, a pyridinium cation, and a tertiary sulfonium cation.

3. The 2-cyanoacrylate-based adhesive composition according to the above items 1 or 2, wherein the content of the onium salt (b) is 10 to 20,000 ppm relative to 100 parts by mass of the 2-cyanoacrylic acid ester (a).

Effect of the Invention

Since the 2-cyanoacrylate-based adhesive composition according to the present invention contains a 2-cyanoacrylic acid ester and an onium salt having a specific structure, it not only exhibits an excellent adhesion rate for metals and low-polarity thermoplastic elastomers, but also has good storage stability. In addition, the above adhesive composition gives hardened bodies excellent in appearance since it does not cause clouding in hardened bodies when used for bonding, filling or potting of a wide range of adherends.

DESCRIPTION OF EMBODIMENTS

Details of the 2-cyanoacrylate-based adhesive composition (which is hereinafter often simply referred to as "adhesive composition") according to the present invention are described below.

The adhesive composition of the present invention contains (a) a 2-cyanoacrylic acid ester and (b) an onium salt having a specific structure.

As the "(a) 2-cyanoacrylic acid ester", 2-cyanoacrylic acid esters generally employed in this type of adhesive compositions can be used without any particular restriction. The 2-cyanoacrylic acid ester includes methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl esters of 2-cyanoacrylic acid. These 2-cyanoacrylic acid esters can be used alone or in combination of two or more. Furthermore, among these 2-cyanoacrylic acid esters, 2-cyanoacrylic acid esters having an alkyl group with 3 or less carbon atoms are preferred since they are excellent in curability, and ethyl 2-cyanoacrylate is more preferred.

The adhesive composition according to the present invention contains "(b) an onium salt represented by the following general formula (1)". The onium salt functions as a hardening accelerator of the adhesive composition, and particularly is a compound which improves the adhesion rate for metals and thermoplastic elastomers.

$$C^+A^- \quad (1)$$

wherein, in formula (1), $C^+$ represents an onium cation, and $A^-$ represents a bis(fluorosulfonyl)imide anion.

The cations of the onium salt are not particularly limited as long as they can impart solubility in 2-cyanoacryalte to the onium salt, and include, for example, an onium cation represented by the following general formula (2), an imidazolium cation, a pyridinium cation, and an onium cation represented by the following general formula (3).

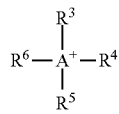

(2)

wherein, in formula (2), $R^3$ to $R^6$ each independently represents a non-substituted or substituted alkyl group, cycloalkyl group, aryl group, aralkyl group, alkenyl group or alkynyl group; otherwise, part or all of $R^3$ to $R^6$ may form a non-substituted or substituted 3 to 10 membered ring together with the atom represented by A wherein the ring may contain a hetero atom such as O and S, provided that $R^3$ to $R^6$ which do not involve the formation of the ring are the same as defined hereinbefore; and A represents a nitrogen atom or phosphorus atom. Specific examples of the above substituted alkyl group include, for example, an alkoxy group and an alkanoyl group. The above non-substituted or substituted alkyl group preferably has 1 to 20 carbon atoms, and more preferably 1 to 16 carbon atoms. When part of $R^3$ to $R^6$ form a ring, the ring is, in general, constituted by 2 to 3 of $R^3$ to $R^6$. Specific examples of the compound represented by the formula (2) in which two of $R^3$ to $R^6$ form a ring include piperidinium cation, morpholinium cation, and pyrrolidinium cation.

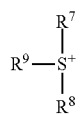

(3)

wherein, in formula (3), $R^7$ to $R^9$ each independently represents a non-substituted or substituted alkyl group, cycloalkyl group, aryl group, aralkyl group, alkenyl group or alkynyl group; otherwise, part or all of $R^7$ to $R^9$ may form a non-substituted or substituted 3 to 10 membered ring together with the sulfur atom wherein the ring may contain a hetero atom such as O and S, provided that $R^7$ to $R^9$ which do not involve the formation of the ring are the same as defined hereinbefore. Specific examples of the above substituted alkyl group include, for example, an alkoxy group and an alkanoyl group. The above non-substituted or substituted alkyl group preferably has 1 to 20 carbon atoms, and more preferably 1 to 16 carbon atoms.

Representative examples of the onium cations represented by the formula (2) include quaternary ammonium cations, quaternary phosphonium cations, and the like.

Specific examples of the quaternary ammonium cations include tetraalkylammonium cations such as tetramethylammonium, ethyltrimethylammonium, diethyldimethylammonium, triethylmethylammonium, tetraethylammonium, tetra-n-butylammonium, trimethyl-n-propylammonium, trimethyl-isopropylammonium, n-butyltrimethylammonium, isobutyltrimethylammonium, t-butyltrimethylammonium, n-hexyltrimethylammonium, dimethyldi-n-propylammonium, dimethyldiisopropylammonium, dimethyl-n-propylisopropylammonium, methyltri-n-propylammonium, methyltri-isopropylammonium, methyldi-n-propylisopropylammonium, methyl-n-propyldiisopropylammonium, triethyl-n-propylammonium, triethylisopropylammonium, n-butyltriethylammonium, triethylisobutylammonium, t-butyltriethylammonium, di-n-butyldimethylammonium, diisobutyldimethylammonium, di-t-butyldimethylammonium, n-butylethyldimethylammonium, isobutylethyldimethylammonium, t-butylethyldimethylammonium, n-butylisobutyldimethylammonium, n-butyl-t-butyldimethylammonium, t-butylisobutyldimethylammonium, diethyldi-n-propylammonium, diethyldiisopropylammonium, diethyl-n-propylisopropylammonium, ethyltri-n-propylammonium, ethyltri-isopropylammonium, ethylisopropyldi-n-propylammonium, ethyldiisopropyl-n-propylammonium, diethylmethyl-n-propylammonium, ethyldimethyl-n-propylammonium, ethylmethyldi-n-propylammonium, diethylisopropylmethylammonium, ethylisopropyldimethylammonium, ethyldiisopropylmethylammonium, ethylmethyl-n-propylisopropylammonium, tetra-n-propylammonium, tetra-isopropylammonium, tri-isopropyl-n-propylammonium, diisopropyldi-n-propylammonium, isopropyl-tri-n-propylammonium, butyltrimethylammonium, trimethylpentylammonium, hexyltrimethylammonium, heptyltrimethylammonium, trimethyloctylammonium, trimethylnonylammonium, decyltrimethylammonium, trimethylundecylammonium, dodecyltrimethylammonium, didecyldimethylammonium, dilauryldimethylammonium, dimethyldistyrylammonium, dimethyldioctadecylammonium, dimethyldioctylammonium, dimethyldipalmitylammonium, ethylhexadecyldimethylammonium, hexyldimethyloctylammonium, dodecyl(ferrocenylmethyl)dimethylammonium, N-methyl homatropinium and the like; aromatic alkyl-group substituted ammonium cations such as benzyltrimethylammonium, benzyltributylammonium, benzyldodecyldimethylammonium, and the like; aromatic substituted ammonium cations such as trimethylphenylammonium, tetraphenylammonium, and the like; and aliphatic cyclic ammonium cations such as pyrrolydinium (such as 1,1-dimethylpyrrolydinium, 1-ethyl-1-methylpyrrolydinium, 1,1-diethylpyrrolydinium, 1,1-tetramethylenepyrrolydinium, and 1-butyl-1-methylpyrrolydinium), piperidinium (such as 1,1-dimethylpiperidinium, 1-ethyl-1-methyl piperidinium, 1,1-diethylpiperidinium, and 1-butyl-1-methylpiperidinium), and morpholinium (such as 1,1-dimethylmorpholinium, 1-ethyl-1-methylmorpholinium, and 1,1-diethylmorpholinium).

Specific examples of the quaternary phosphonium cations include cations such as tetramethylphosphonium, triethylmethylphosphonium, and tetraethylphosphonium.

Specific examples of the imidazolium cations include cations such as 1,3-dimethylimidazolium, 1,2,3-trimethylimidazolium, 1-ethyl-3-methylimidazolium, 1-ethyl-2,3-dimethylimidazolium, 1-methyl-3-n-octylimidazolium, 1-hexyl-3-methylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-n-butyl-2,3-dimethylimidazolium, 1,2,4-trimethyl-3-n-propylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 2-n-heptyl-1,3-dimethylimidazolium, 1,3,4-trimethylimidazolium, 2-ethyl-1,3,4-trimethylimidazolium, 1,3-dimethylbenzimidazolium, 3-methyl-1-phenylimidazolium, 1-benzyl-3-methylimidazolium, 2,3-dimethyl-1-phenylimidazolium, 1-benzyl-2,3-dimethylimidazolium, 1,3-dimethyl-2-phenylimidazolium, 2-benzyl-1,3-dimethylimidazolium, 1,3-dimethyl-2-n-undecylimidazolium, and 1,3-dimethyl-2-n-heptadecylimidazolium.

The pyridinium cations include cations such as 1-methylpyridinium, 1-ethylpyridinium, 1-n-propylpyridinium, 1-isopropylpyridinium, 1-n-butylpyridinium, and 1-n-butyl-3-methylpyridinium.

Specific examples of the tertiary sulfonium cations represented by the general formula (3) above include cations such as trimethylsulfonium, triethylsulfonium, tripropylsulfonium, and triphenylsulfonium.

Among the aforementioned onium cations, preferred are quaternary ammonium cations, imidazolium cations, pyridinium cations, or tertiary sulfonium cations from the viewpoint of exhibiting excellent solubility to 2-cyanoacrylic acid ester and good balance between high curing acceleration property and storage stability of the adhesive composition; and further preferred are quaternary ammonium cations, imidazolium cations or pyridinium cations.

Next, the anion of the onium salt is a bis(fluorosulfonyl)imide anion. Since the bis(fluorosulfonyl)imide anion has little nucleophilicity, it has no adverse effect on storage stability of the adhesive composition even when it is present as an onium salt in the adhesive composition. On the other hand, since the conjugate acid for the above anion is strongly acidic, it reacts with a very small amount of salts or the like present on the surface of an adherend to liberate an anion that has nucleophilicity and thus can become a polymerization initiator for 2-cyanoacryltes. As a result, excellent adhesion rate can be exhibited even when an adherend is of a metal or a low-polarity thermoplastic elastomer.

The onium salt used in the present invention is not particularly limited so long as it is a combination of the cations and the anions described hereinbefore. Examples of the onium salt include tetraethylammonium bis(fluorosulfonyl)imide, tetra-n-butylammonium bis(fluorosulfonyl)imide, methyltri-n-octylammonium bis(fluorosulfonyl)imide, dodecyl trimethylammonium bis(fluorosulfonyl)imide, 1-ethyl-3-methylimidazolium bis(fluorosulfonyl)imide, 1-ethyl-2,3-dimethylimidazolium bis(fluorosulfonyl)imide, 1-butyl-3-methylimidazolium bis(fluorosulfonyl)imide, 1-butyl-2,3-dimethylimidazolium bis(fluorosulfonyl)imide, 1-ethyl-1-methylpiperidinium bis(fluorosulfonyl)imide, 1-butyl-1-methylpiperidinium bis(fluorosulfonyl)imide, 1-ethyl-1-methylpyrrolidinium bis(fluorosulfonyl)imide, 1-butyl-1-methylpyrrolidinium bis(fluorosulfonyl)imide, 1-methyl-1-propylpyrrolidinium bis(fluorosulfonyl)imide, 4-methyl-1-octylpyridinium bis(fluorosulfonyl)imide, 1-ethyl pyridinium bis(fluorosulfonyl)imide, 1-ethyl-3-methylpyridinium bis(fluorosulfonyl)imide, 1-butyl-3-methylpyridinium bis(fluorosulfonyl)imide, triethylsulfonium bis(fluorosulfonyl)imide, and triethylmethylphosphonium bis(fluorosulfonyl)imide. These onium salts may be used alone or in combination of two or more.

The onium salt according to the present invention can be prepared by methods known in the art. For example, they can be prepared by obtaining a bis(fluorosulfonyl)imide anion from urea and fluorosulfonic acid as described in Martin Beran et al., Z. Anorg. Allg. Chem., 2005, 631, 55-59, followed by reaction with a corresponding onium halide as described in Hiroyuki Ohno et al., J. Am. Chem. Soc., 2005, 27, 2398-2399 or Peter Wasserscheid et al., Green Chemistry, 2002, 4, 134-138.

The content of the aforementioned onium salt (b) in the adhesive composition is, preferably from 10 to 20000 ppm, more preferably from 25 to 15000 ppm, and further preferably from 50 to 10000 ppm, per 100 parts by mass of 2-cyanoacrylic acid ester (a). When the content is within the above range, the effect of hardening acceleration is sufficiently exhibited, and the storage stability of the adhesive composition is kept good.

The reason why the aforementioned onium salt improves the adhesion rate on metals and thermoplastic elastomers without impairing the storage stability of the adhesive composition is not yet clear, however, can be presumed as follows. Since the conjugate acid of the weakly nucleophilic anion that constitutes the onium salt is a strong acid, it releases an anion which is nucleophilic and thus serves as a polymerization initiator of the 2-cyanoacrylic acid ester when it reacts with a salt that is present on a surface of an adherend. On the other hand, since such a salt is not present during storage, the aforementioned anion exchange reaction does not take place to initiate the release of the highly reactive anion, so that excellent storage stability is maintained.

The adhesive composition of the present invention may contain, in addition to the aforementioned onium salts, another hardening accelerator conventionally blended in these types of adhesive compositions. Examples of such hardening accelerators include polyalkylene oxides, crown ethers, silacrown ethers, calixarenes, cyclodextrins, and pyrogallol-based cyclic compounds.

The polyalkylene oxides refer to polyalkylene oxides and the derivatives thereof, and examples thereof include those disclosed in Japanese Patent Publication (Kokoku) No. Sho. 60-37836, Japanese Patent Publication (Kokoku) No. Hei. 1-43790, Japanese Patent Publication (Laid-open) No. Sho. 63-128088, Japanese Patent Publication (Laid-open) No. Hei. 3-167279, U.S. Pat. No. 4,386,193, and U.S. Pat. No. 4,424,327. Concrete examples thereof include (1) polyalkylene oxides such as diethylene glycol, triethylene glycol, polyethylene glycol, and polypropylene glycol; and (2) derivatives of polyalkylene oxides such as polyethylene glycol monoalkyl esters, polyethylene glycol dialkyl esters, polypropylene glycol dialkyl esters, diethylene glycol monoalkyl ethers, diethylene glycol dialkyl ethers, dipropylene glycol monoalkyl ethers, and dipropylene glycol dialkyl ethers.

Examples of the crown ethers include those disclosed in, for instance, Japanese Patent Publication (Kokoku) No. Sho. 55-2238 and Japanese Patent Publication (Laid-Open) No. Hei. 3-167279. Concrete examples thereof include 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, and 1,2-vinylbenzo-15-crown-5. Examples of the silacrown ethers include, for example, those disclosed in Japanese Patent Publication (Laid-Open) No. Sho. 60-168775. Concrete examples thereof include dimethylsila-11-crown-4, dimethylsila-14-crown-5, and dimethylsila-17-crown-6.

Examples of the calixarenes include those disclosed in Japanese Patent Publication (Laid-Open) No. Sho. 60-179482, Japanese Patent Publication (Laid-Open) No. Sho. 62-235379, and Japanese Patent Publication (Laid-Open) No. Sho. 63-88152. Concrete examples thereof include 5,11,17,23,29,35-hexa-tert-butyl-37,38,39,40,41,42-hexahydroxycalix[6]arene, 37,38,39,40,41,42-hexahydroxycalix[6] arene, 37,38,39,40,41,42-hexa-(2-oxo-2-ethoxy)-ethoxycalix[6] arene, 25,26,27,28-tetra-(2-oxo-2-ethoxy)-ethoxycalix[4]arene, and tetraethyl 4-tert-butylcalix[4]arene-O,O',O",O'"-tetraacetate. Examples of the cyclodextrins include those disclosed in Japanese Patent Publication (Kohyo) No. Hei. 5-505835. Concrete examples thereof include α-, β-, or γ-cyclodextrins. Examples of the pyrogallol-based cyclic compounds include compounds disclosed in Japanese Patent Publication (Laid-Open) No. 2000-191600. Concrete examples thereof include 3,4,5,10,11,12,17,18,19,24,25,26-dodecaethoxycarbomethoxy-C-1, C-8, C-15, C-22-tetramethyl[14]-metacyclophane. These hardening accelerators may be used either alone or in combination of two or more thereof.

In the adhesive composition, the content of the hardening accelerators other than the onium salt is preferably from 10 to 30000 ppm, more preferably from 50 to 20000 ppm, and most preferably from 100 to 10000 ppm relative to 100 parts by mass of 2-cyanoacrylic acid ester. The adhesive composition can be improved in the adhesion rate on various adherends without impairing the storage stability so long as the content falls within the range of from 10 to 30000 ppm.

In addition to the above hardening accelerator, the adhesive composition of the present invention may contain stabilizers, plasticizers, thickeners, particles, colorants, fragrances, solvents, strength improvers or others that have conventionally been employed in adhesive compositions containing 2-cyanoacrylic acid ester, depending on the objectives, in proper amounts that do not impair curability, adhesion strength or the like of the adhesive composition.

The stabilizers include (1) anion polymerization inhibitors, such as sulfur dioxide, aliphatic sulfonates such as methanesulfonate, aromatic sulfonates such as p-toluenesulfonate, boron trifluoride complexes such as boron trifluoride methanol and boron trifluoride diethyl ether, $HBF_4$, and trialkyl borate; and (2) radical polymerization inhibitors such as hydroquinone, hydroquinone monomethyl ether, t-butylcatechol, catechol, and pyrogallol. These stabilizers may be used alone, or in a combination of two or more thereof.

The plasticizers include triethyl acetyl citrate, tributyl acetyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexyl-cyclohexyl carboxylate, diisobutyl fumarate, diisobutyl maleate, caproic triglyceride, 2-ethylhexyl benzoate, and dipropylene glycol dibenzoate. Among them, preferred from the viewpoint of good miscibility with 2-cyanoacrylic acid ester and of high plasticizing efficiency are tributyl acetyl citrate, dimethyl adipate, dimethyl phthalate, 2-ethylhexyl benzoate, and dipropylene glycol dibenzoate. These plasticizers may be used alone or in combination of two or more thereof.

The thickeners include polymethylmethacrylates, copolymers of methylmethacrylate and an acrylate, copolymers of methylmethacrylate and another methacrylate, acrylic rubbers, polyvinylchloride, polystyrene, cellulose esters, polyalkyl-2-cyanoacrylate, and ethylene-vinyl acetate copolymers. These thickeners may be used either alone or in combination of two or more thereof.

EXAMPLES

The present invention is explained in further detail byway of Examples below. However, the present invention is not limited to these Examples, but various modifications and changes can be made to the present invention without departing from the gist of the present invention. In the description below, parts and percentages are based on mass unless otherwise mentioned.

1. Evaluation Method (1) Adhesion Rate

The adhesion rate was measured at 23° C. under 60% RH, in accordance with JIS K 6861 "Testing methods for α-cyanoacrylate adhesives". The test pieces used in the measurement were as follows.

Aluminum: Aluminum test piece (material: A1050P), manufactured by Nippon Testpanel Co., Ltd.

Iron: Iron test piece (material: S10C), manufactured by Nippon Testpanel Co., Ltd.

Styrene thermoplastic elastomer: "ACTYMER AE-2060S" (trade name), manufactured by RIKEN TECHNOS CORP.

(2) Viscosity

Viscosity was measured using E-type viscometer at 25° C. and 100 rpm.

(3) Storage Stability

Evaluation was made by comparing the adhesion rate and viscosity measured at the initial stage with the adhesion rate and viscosity measured after storage for two weeks under the environment of 50° C. and 95% RH. For the storage, 1.5 g of the adhesive composition was sealed in a 2 g polyethylene container.

(4) Appearance after Cured

Several drops of the adhesive composition were placed on EPDM (ethylene propylene rubber) and soft PVC (polyvinyl chloride) plates of 25 mm (length)×50 mm (width)×3 mm (thickness), and were allowed to set under the environment of 23° C. and 60% RH for 3 days. The appearance of the hardened body was observed and indicated by "o" or "X". "o" indicates that no clouding or wrinkle was observed on the hardened body, whereas "X" indicates that clouding or wrinkle was observed on the hardened body. The test pieces used were as follows.

EPDM: EPDM-5065/3t, manufactured by CHUKYO-GOMU CORPORATION,
Soft PVC: TOUGHNYL D-Blue (trade name), manufactured by Japan Wavelock Co., Ltd.

2. Preparation of 2-Cyanoacrylate-Based Adhesive Composition

Example 1

To ethyl 2-cyanoacrylate were added 40 ppm of sulfur dioxide and 1000 ppm of hydroquinone (with respect to 100 parts by mass of ethyl 2-cyanoacrylate), and 100 ppm (refer to Table 1) of 1-ethyl-3-methylimidazolium bis(fluorosulfonyl)imide ("ELEXCEL AS-110" (trade name) manufactured by DKS Co. Ltd.) was blended therewith. The resulting blend was stirred to mix for 30 minutes under room temperature (15 to 30° C.) to produce an adhesive composition. The thus-obtained adhesive composition was subjected to evaluation of adhesion rates on aluminum, iron and thermoplastic elastomer, viscosity, storage stability, and appearance of hardened body. The results are given in Table 2.

Examples 2 to 10 and Comparative Examples 1 to 4

Adhesive compositions were produced and evaluated in the same manner as in Example 1, except that the onium salt or hardening accelerator to be blended with the adhesive compositions was changed as shown in Tables 1 and 3. The results are given in Tables 2 and 4.

TABLE 1

| | | Onium salt | |
|---|---|---|---|
| | | Type | Content (ppm) |
| Example | 1 | 1-ethyl-3-methyl-imidazolium bis(fluorosulfonyl)imide | ELEXCEL AS-110, manufactured by DKS Co. Ltd. | 100 |
| | 2 | 1-ethyl-3-methyl-imidazolium bis(fluorosulfonyl)imide | ELEXCEL AS-110, manufactured by DKS Co. Ltd. | 250 |
| | 3 | 1-ethyl-3-methyl-imidazolium bis(fluorosulfonyl)imide | ELEXCEL AS-110, manufactured by DKS Co. Ltd. | 500 |
| | 4 | 1-ethyl-3-methyl-imidazolium bis(fluorosulfonyl)imide | ELEXCEL AS-110, manufactured by DKS Co. Ltd. | 2000 |
| | 5 | 4-methyl-1-octyl-pyridinium bis(fluorosulfonyl)imide | ELEXCEL AS-804, manufactured by DKS Co. Ltd. | 500 |
| | 6 | 4-methyl-1-octyl-pyridinium bis(fluorosulfonyl)imide | ELEXCEL AS-804, manufactured by DKS Co. Ltd. | 1000 |
| | 7 | 4-methyl-1-octyl-pyridinium bis(fluorosulfonyl)imide | ELEXCEL AS-804, manufactured by DKS Co. Ltd. | 10000 |
| | 8 | dodecyltrimethyl-ammonium bis(fluorosulfonyl)imide | MP-402, manufactured by DKS Co. Ltd. | 100 |
| | 9 | dodecyltrimethyl-ammonium bis(fluorosulfonyl)imide | MP-402, manufactured by DKS Co. Ltd. | 250 |
| | 10 | dodecyltrimethyl-bis ammonium (fluorosulfonyl)imide | MP-402, manufactured by DKS Co. Ltd. | 500 |

TABLE 2

| | | Initial | | | | After 2 weeks (50° C., 95% RH) | | | | Appearance after cured | |
|---|---|---|---|---|---|---|---|---|---|---|---|
| | | Adhesion rate (seconds) | | | | Adhesion rate (seconds) | | | | | |
| | | Aluminum | Iron | Thermo-plastic Elastomer | Viscosity (mPa·s) | Aluminum | Iron | Thermo-plastic Elastomer | Viscosity (mPa·s) | On EPDM | On Soft PVC |
| Examples | 1 | 30 | 30 | 60 | 2.2 | 30 | 30 | 60 | 2.4 | ○ | ○ |
| | 2 | 30 | 20 | 30 | 2.2 | 30 | 20 | 45 | 2.4 | ○ | ○ |
| | 3 | 20 | 15 | 30 | 2.2 | 20 | 20 | 30 | 2.5 | ○ | ○ |
| | 4 | 10 | 10 | 20 | 2.6 | 20 | 20 | 30 | 3.1 | ○ | ○ |
| | 5 | 30 | 30 | 45 | 2.4 | 30 | 30 | 45 | 2.7 | ○ | ○ |
| | 6 | 20 | 20 | 30 | 2.7 | 30 | 20 | 45 | 3.0 | ○ | ○ |
| | 7 | 10 | 10 | 20 | 3.0 | 30 | 20 | 30 | 3.9 | ○ | ○ |
| | 8 | 30 | 30 | 60 | 2.3 | 30 | 30 | 60 | 2.5 | ○ | ○ |
| | 9 | 20 | 20 | 45 | 2.4 | 30 | 20 | 45 | 2.6 | ○ | ○ |
| | 10 | 15 | 15 | 30 | 2.5 | 20 | 15 | 30 | 2.7 | ○ | ○ |

| | | Additive | | |
|---|---|---|---|---|
| | | Type | Trade name, etc. | Content (ppm) |
| Comparative Examples | 1 | 15-Crown-5 | Crown Ether O-15, manufactured by NIPPON SODA CO., LTD. | 2500 |
| | 2 | 18-Crown-6 | Reagent, manufactured by Kishida Chemical Co., Ltd. | 500 |
| | 3 | Tetraethyl4-tert-butylcalix[4] arene-O,O',O'',O'''-tetraacetate | CALIX B4-EA, manufactured by Sugai Chemical IND. CO., LTD. | 2000 |
| | 4 | Additive-free | — | — |

TABLE 2

| | | Initial | | | After 2 weeks (50° C., 95% RH) | | | | Appearance after cured | |
|---|---|---|---|---|---|---|---|---|---|---|
| | | Adhesion rate (seconds) | | | Adhesion rate (seconds) | | | | | |
| | | Aluminum | Iron | Thermoplastic Elastomer | Viscosity (mPa·s) | Aluminum | Iron | Thermoplastic Elastomer | Viscosity (mPa·s) | On EPDM | On Soft PVC |
| Examples | 1 | 45 | 45 | 180 | 2.1 | 45 | 45 | 180 | 2.5 | X | X |
| | 2 | 60 | 60 | 120 | 2.1 | 90 | 60 | 180 | 3.7 | X | X |
| | 3 | 60 | 45 | 180 | 2.2 | 60 | 60 | 300 | 2.5 | ○ | X |
| | 4 | 120 | 120 | 300 | 2.1 | 120 | 180 | >300 | 2.1 | X | X |

The results in Tables 2 and 4 show that the adhesive compositions in Examples 1-10 exhibit excellent adhesion rates on aluminum, iron and low-polarity thermoplastic elastomer, compared with the conventional adhesive compositions (Comparative Examples 1-4). Also, it is found that the adhesive compositions according to the present invention show a viscosity change of 1.5 or less even after two weeks at 50° C. and 95% RH, and thus are excellent in storage stability, and are also excellent in appearance of hardened bodies on both EPDM and soft PVC adherends.

INDUSTRIAL APPLICABILITY

The present invention which is based on 2-cyanoacrylic acid ester can be utilized as a so-called instantaneous adhesive in a wide range of products and technical fields in various types of industrial fields including household and medical fields, and is particularly useful for applications that require quick adhesion on metallic or low-polarity adherends.

The invention claimed is:

1. A 2-cyanoacrylate-based adhesive composition which comprises (a) a 2-cyanoacrylic acid ester and (b) an onium salt represented by the following formula (1):

$$C^+A^- \tag{1}$$

wherein $C^+$ represents an onium cation, and $A^-$ represents a bis(fluorosulfonyl)imide anion.

2. The 2-cyanoacrylate-based adhesive composition according to claim 1, wherein the cation of the onium salt (b) is at least one onium cation selected from a group consisting of a quaternary ammonium cation, an imidazolium cation, a pyridinium cation, and a tertiary sulfonium cation.

3. The 2-cyanoacrylate-based adhesive composition according to claim 1, wherein the content of the onium salt (b) is 10 to 20,000 ppm relative to 100 parts by mass of the 2-cyanoacrylic acid ester (a).

4. The 2-cyanoacrylate-based adhesive composition according to claim 2, wherein the content of the onium salt (b) is 10 to 20,000 ppm relative to 100 parts by mass of the 2-cyanoacrylic acid ester (a).

* * * * *